March 31, 1925.
G. D. ANGLE
COOLING SYSTEM FOR INTERNAL COMBUSTION ENGINES
Filed March 9, 1922
1,531,589
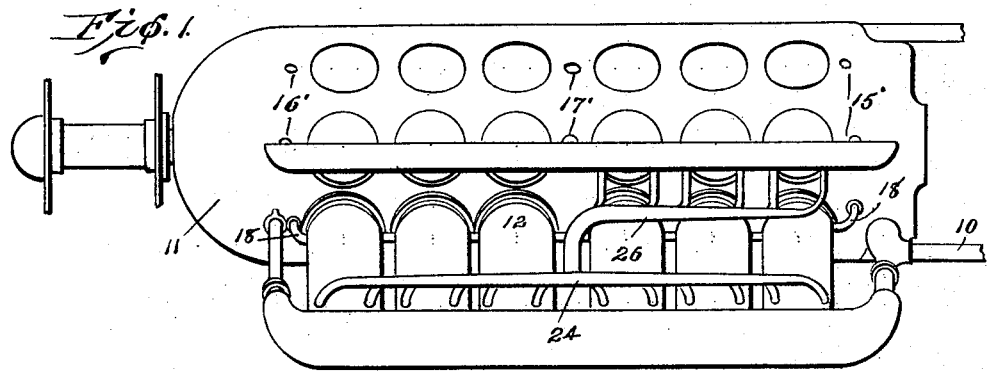
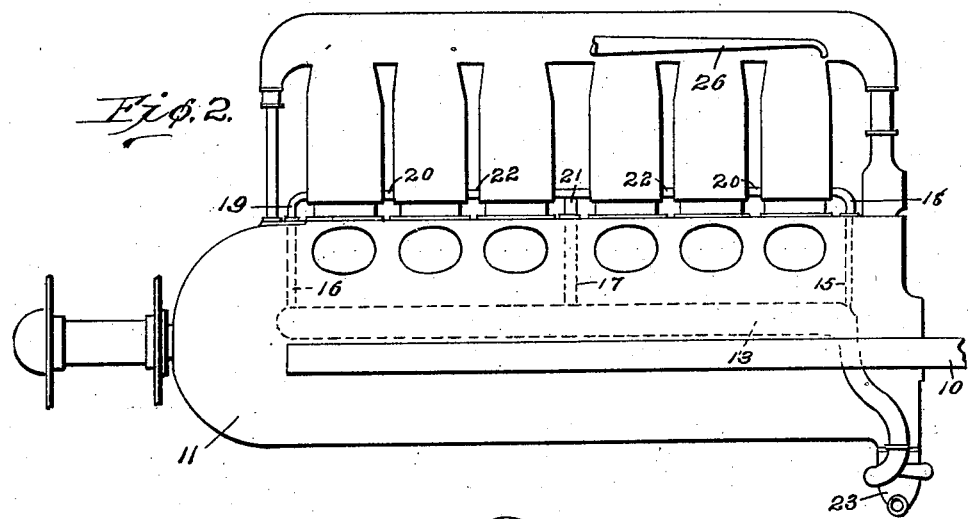
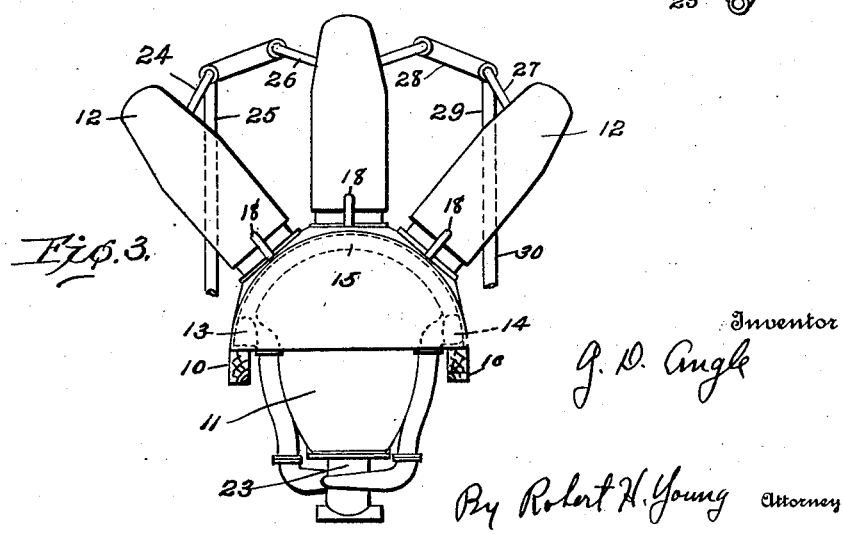
Inventor
G. D. Angle
By Robert H. Young Attorney Patented Mar. 31, 1925.

1,531,589

UNITED STATES PATENT OFFICE.

GLENN D. ANGLE, OF DETROIT, MICHIGAN.

COOLING SYSTEM FOR INTERNAL-COMBUSTION ENGINES.

Application filed March 9, 1922. Serial No. 542,322.

*To all whom it may concern:*

Be it known that I, GLENN D. ANGLE, a citizen of the United States, residing at Detroit, in the county of Wayne and State of Michigan, have invented certain new and useful Improvements in Cooling Systems for Internal-Combustion Engines, of which the following is a specification.

This invention relates to a cooling system for internal combustion engines in which a circulating liquid is employed.

My invention differs principally from the usual practice in having water passages provided in the crank-case thus eliminating external piping to a large extent. Although this system can be applied to almost any water cooled internal combustion engine, it particularly adapts itself to an eighteen cylinder W type engine composed of three banks of six cylinders each, in which the cylinders are placed quite close together and leave little or no room for piping to the center row.

In addition to its particular adaptability to the W type engine, this system has certain other advantages which recommend its use on other types. For instance, the cored passages along the sides of the crankcase expose wide water cooled surfaces to the hot oil vapors of the crankcase which naturally run down these sides and are cooled thereby. The main advantage in such an arrangement is that it is much easier to handle the heat dissipated by the engine through a single cooling system than by separate oil and water radiators. The extra walls for the cored water passages have a marked effect in increasing the rigidity and strength of the crankcase structure.

According to my invention the cooling water is taken from the crankcase passages by short connections arranged to give a uniform and equally distributed flow. The number of hose connections are reduced to a minimum and likewise the accompanying troubles due to water leaks.

The invention is hereinafter described in connection with the accompanying drawings, in which:

Figure 1 is a plan view of a W-type engine showing the cylinders of the upper half of the figure removed;

Figure 2 is a side elevation of the engine with an outer bank of cylinders removed; and Figure 3 is an end view showing the application of the cooling system to three banks of cylinders.

The engine sills 10 support an engine having a crankcase 11 and cylinders 12. These cylinders are arranged in three banks of six each, the cylinders of the outer banks being inclined and those of the central bank being vertical so that the arrangement resembles the letter W. These cylinders are water cooled and the water is conducted to the jackets thereof in a novel manner, as will hereinafter appear.

The upper part of the crankcase is formed with cored passages at bores 13, 14 which extend longitudinally along the sides thereof. Cored passages 15, 16 and 17 extend transversely of the crankcase between the passages 13, 14 at the ends and center of the cylinder banks respectively. The passage 17 is larger than either of the passages 15 or 16. Short pipe connections 18, 19, 20 afford communication between the lower ends of the water jackets of the two outermost cylinders at each end of the banks and the transverse passages 15, 16 through suitable openings 15', 16' in the top of the crankcase. The central passage 17 communicates with the lower ends of the water jackets of the inner pairs of cylinders arranged at opposite sides thereof by means of pipe connections 21, 22, the former leading from suitable openings 17' in the crankcase. Thus it may be said that the end connections 18, 19 each serve one and one half cylinders of each bank and the central connection 21 serves three cylinders thereof. In this manner cooling water of substantially the same temperature is uniformly distributed to all the cylinders. The water is introduced into the side passages 13, 14 from one or more pumps 23 connected to the radiator (not shown).

The cooling water after passing up through the water jackets of one bank of inclined cylinders is conducted to a water manifold 24 which leads to an outlet pipe 25. A manifold 26 receives the water from the three right hand cylinders of the central bank, as shown in Fig. 1, and conducts it to the common outlet pipe 25. The water from the other bank of inclined cylinders and from the three left hand cylinders of the central bank is in like manner conducted by manifolds 27 and 28 to a common outlet 30. The outlet pipes 25 and 30 return the water to the radiator (not shown) of the engine.

The above described construction distributes the cooling water uniformly to the engine cylinders with the use of very few external pipes, which results in economy of space, an important feature with this type of engine. The cored passages increase to a remarkable degree the strength and rigidity of the crankcase and at the same time serve to distribute water of substantially uniform temperature to the water jackets of the cylinder. The water connections are simplified and reduced in number by the novel arrangement of this invention thus lessening the probability of leakage occurring therein. Furthermore the connections are accessible so that any leakage at these places can be detected and readily remedied. The cored passages in the crankcase also present large cooling surfaces which are effective in cooling the lubricating oil, as previously described.

I claim:

1. In an internal combustion engine, the combination with the cylinders thereof having water jackets, of a crankcase having longitudinally extending cored passages on opposite sides and transverse passages connected therebetween, connections from said transverse passages to said water jackets, and means for causing the cooling liquid to circulate through said passages and water jackets.

2. In an internal combustion engine, the combination with the cylinders thereof arranged in a plurality of banks and having water jackets, of a crankcase having longitudinally extending cored passages on opposite sides and transverse passages connected therebetween, and separate connections from said transverse passages to the water jackets of each bank of cylinders.

3. In a water cooled internal combustion engine of the W-type, a crank case having longitudinally extending cored passages and transverse passages therebetween, connections from some of said transverse passages to the end cylinders of each bank and connections from another of said transverse passages to the inner cylinders of each bank.

In testimony whereof I affix my signature.

GLENN D. ANGLE.